United States Patent [19]

Wernsing

[11] 4,362,823

[45] Dec. 7, 1982

[54] METHOD AND COMPOSITION FOR CLOSED CELL FOAM FORMATION

[75] Inventor: David G. Wernsing, Littleton, Colo.

[73] Assignee: Manville Service Corporation, Denver, Colo.

[21] Appl. No.: 295,057

[22] Filed: Aug. 21, 1981

[51] Int. Cl.³ .................. C08G 18/14; C08G 18/32
[52] U.S. Cl. .................................. 521/116; 521/914
[58] Field of Search ........................... 521/116, 914

[56] References Cited

U.S. PATENT DOCUMENTS

| | | | |
|---|---|---|---|
| 3,857,800 | 12/1974 | Fishbein et al. | 521/914 |
| 3,865,762 | 2/1975 | Repiqnet et al. | 521/914 |
| 3,985,688 | 10/1976 | Speech | 521/116 |
| 4,160,076 | 7/1979 | Guthrie et al. | 521/116 |
| 4,190,711 | 2/1980 | Zdrahala et al. | 521/914 |
| 4,273,884 | 6/1981 | Dominguez | 521/116 |
| 4,303,755 | 12/1981 | Yukuta et al. | 521/914 |

OTHER PUBLICATIONS

Griffin, Official Digest, Jun. 1956, pp. 446-455.
Technical Data on Pluronic Polyols, BASF Wyandotte Corp., Wyandotte, Michigan (OS-796) no Date.
Technical Data on Tetronic Polyols Series of Non-ionic Surfactants, BASF Wyandotte Corp., Wyandotte, Michigan (O-85R/2) no date.
Schönfeldt, Surface Active Ethylene Oxide Adducts, Pergamon Press, Oxford (1969) pp. 78-81 and 227-235.

Primary Examiner—H. S. Cockeram
Attorney, Agent, or Firm—Robert M. Krone; Joseph J. Kelly; Gregory W. O'Connor

[57] ABSTRACT

Small amounts of ethoxylated (propoxylated propylene glycol) utilized as a surfactant/emulsifier for polyolisocyanate reaction systems for producing rigid foams that can produce at least 80% closed cell formation where the surfactant does not produce undesirable reaction products with the isocyanate and has an HLB less than 4.

4 Claims, 2 Drawing Figures

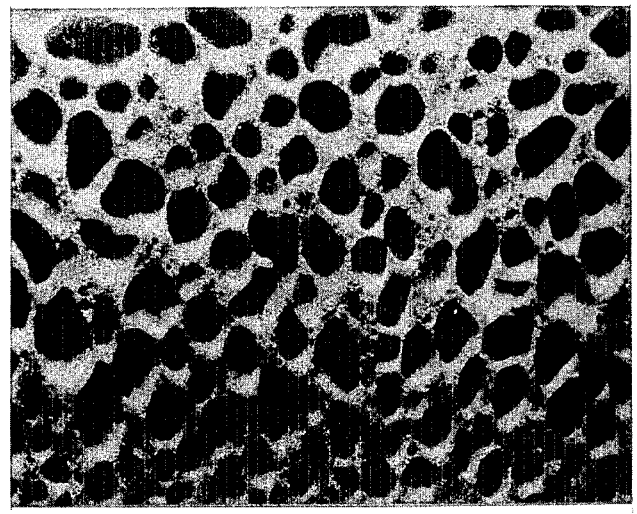
Fig 1.
Fig. 2
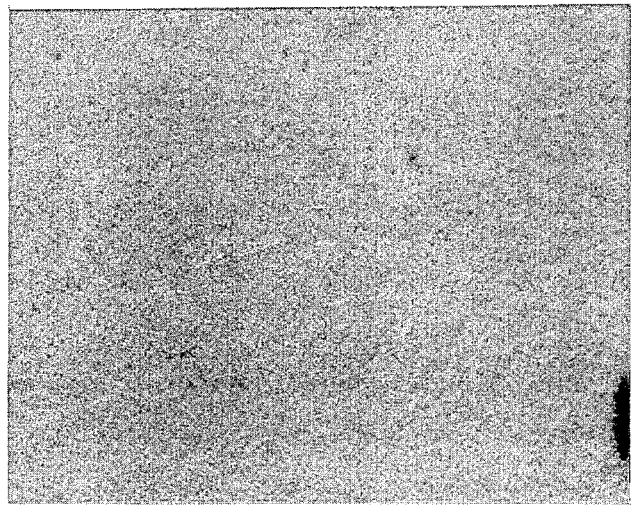

METHOD AND COMPOSITION FOR CLOSED CELL FOAM FORMATION

BACKGROUND OF THE INVENTION

This invention relates to the production of rigid polyisocyanurate or polyurethane foam materials used in the building materials trade. In particular this invention relates to the production of rigid foam materials manufactured from the reaction of polyols and isocyanates generally and specifically to reactants that contain additives capable of modifying the form of the resultant product to produce fine cell structures which are desirable to have in the finished product.

Specifically, compounds acting as surfactants and/or emulsifiers have been extensively investigated for use in the production of uniform cell polyurethane foam materials, both rigid and flexible, and many non-ionic types of compounds or mixtures therewith have been employed. U.S. Pat. No. 4,207,410 at Column 5, lines 45, et. seq., lists several non-ionic material having utility for modifying cell uniformity and size.

It is generally believed that surfactants, and preferably silicone based surfactant compositions, have the ability to stabilize the bubbles formed during the polymerization reaction. Without a suitable surfactant, the bubbles would progressively get larger resulting in a very coarse, open celled foam structure with poor thermal conductivity properties.

The non-ionic surfactants useful in this process can generally be characterized as water-in-oil emulsifiers which assist in the mixing of the lipophilic isocyanate and the hydrophilic polyol. It is also desirable to utilize surfactants that do not react deleteriously with either of these reactants in the polymerization reaction.

Since some surfactants of the water-in-oil variety contain reactive OH groups or can be classified as polyols themselves, these would normally be considered unsuitable candidates for selection to achieve the desired results. U.S. Pat. No. 4,160,076 describes several classes of materials which react with isocyanates suitable for the manufacture of polyurethane foam which themselves can be characterized as non-ionic surfactants. Also some of the materials disclosed in that patent were useful only for the production of large cells in a soft sponge-like foam.

Other patents describing typical polyol-isocyanate reaction mixtures included U.S. Pat. Nos. 3,833,526; 3,703,849; and 3,579,471. The reference literature often referenced is Saunders, J. H. and Frisch, K. C., *Polyurethanes Chemistry and Technology, Part I.* Chemistry, Interscience Publishers, 1963, pg. 244, and Kirk-Othmer, *Encyclopedia of Chemical Technology*, Vol. 19, pp. 531, 532, 553; 554 and Table 22 (2nd Ed.); and Schonfeldt, *Surface Active Ethylene Oxide Adducts*, pp. 227-230, (Pergamon Press, 1969); and W. C. Griffin, Clues to Surfactant Selection Offered by the HLB System Symposium on Surfactants, *Official Digest*, June 1956, pp 446-455.

It can be seen from the descriptions contained in the foregoing that it is important to provide the polyol and the isocyanate mixture with an emulsifier or surfactant that will have an appropriate affinity for both the hydrophilic polyol and the lipophilic isocyanate in order to obtain a uniform distribution of the reactants for the production of a foamed polyurethane product. Many of the currently employed surfactants, particularly the silicone based compounds, while suitable for this function are quite costly and therefore a substitute has been sought which would accomplish the same function.

BRIEF DESCRIPTION OF THE DRAWINGS

FIG. 1 is a photograph of a section through a test bun of rigid polyurethane foam made without the addition of the surfactant of the present invention.

FIG. 2 is a photograph of a section through another test bun of rigid polyurethane foam made as in FIG. 1 with the addition of the surfactant of the present invention.

BRIEF DESCRIPTION OF THE INVENTION

It has been discovered that an ethoxylated (propoxylated propylene glycol) in surprisingly small amounts with respect to the polyol reaction component produces satisfactory emulsification of the reactants when its HLB value is below about 4 and it does not produce observable solids formation when introduced independently into the isocyanate selected. In other words, for a given selection of polyol and isocyanate reactants suitable for the production of rigid foam, an ethoxylated (propoxylated propylene glycol) having an HLB of less than about 4 if employed in amounts of from about 0.1 to about 3 parts per 100 parts by weight of the polyol reactant selected will provide for small, uniform cell formation in the finished product, if, the glycol when tested alone with the isocyanate reactant selected in the same concentrations to be subsequently encountered in the reaction mixture, does not form a visable reaction product such as a skin or other indication of solids formation on standing for a prolonged period of time.

DETAILED DESCRIPTION OF THE INVENTION

The preparation of a polyurethane foam involves the formation of gas bubbles in a polymerizing liquid system and the growth and stabilization of those bubbles as the polymer forms and cures. In most urethane foam formulations, a surface active material is used to stabilize the bubbles and to produce a fine and uniform celled foam structure. In order to stabilize the bubbles, the surface active material or surfactant may perform many roles. The most important roles are generally considered to be:

1. Lowering of the liquid surface tension and thereby reducing the free energy associated with the dispersion of gas.
2. Reduction in thinning thereby preventing rupture of cell membranes.
3. Emulsification of the incompatible urethane ingredients.

The major portion of polyester based flexible and rigid urethane foams made in the 1955-1960 era was produced via a prepolymer or quasi-prepolymer technique. These techniques did not require the complex silicone surfactants utilized today. With the advent of the "one-shot" systems in 1958, the dimethylisiloxanes were replaced by silicone-glycol copolymers. Organic surfactants were used and are still used on a limited basis primarily to help in producing polyester based urethane flexible foams.

It is possible that in certain urethane foam formulations such as rigids, semi-rigids and those employing polyester resins that the viscosity of the reactants as well as the polymer growth rate are major factors in cell control and may be more important than surface tension effects and the reduction in thinning, provided the reactants are suitably emulsified. In other words, if the isocyanate and the polyol are thoroughly mixed and in intimate contact on a molecular level, the chemical reaction should proceed more rapidly with a corresponding rapid increase in molecular weight. The initial reaction rate is therefore very critical in producing fine celled foam. The Saunders article identified hereinbefore states that, "An increase in viscosity retards thinning of membranes. In a urethane foam system, this will be of major importance and doubtless dominates all others after about 40 to 60 seconds." The viscosity increase due to the reaction progress after emulsification is probably even more important than indicated. It is essential therefore that the emulsification of the reactants be accomplished as quickly as possible with reactants whose viscosity permits ready mixing so that the increase in viscosity created by the initial reaction can proceed smoothly and rapidly with controlled bubble formation. In contradistinction to this it is important that early bubble formation be avoided until proper mixing has been accomplished. It is important therefore that the physical mixing and emulsification must be balanced with the initial reaction mechanisms and viscosity increase if a small, uniform closed cell product is to be obtained.

It is this balance which is obtained by the practice of the present invention. Without intending to be bound by any specific theory or reaction mechanism, the presence, at the molecular level, in the surfactant of a relatively large oil soluble portion appears to hinder the reactivity of the surfactant when places in contact with the isocyanate selected.

It is contrary to normal expectations that some reaction with the isocyanate alone does not occur and indeed there may be some form of reaction which, under the conditions described herein does not produce the evolution of gas, the formulation of solids or skinning or even an increase in the viscosity of the isocyanate. The absence of these objectively observable changes has been correlated to attend the success of the surfactant of the present invention in the reaction which relates to its ability to contribute to the formation of small uniform cells in the production of rigid polyurethane foams suitable for use as a building material.

If a reaction does occur, it could also be the reason for the production of the beneficial results obtained since the reaction products, if any, do not promote gas evolution, solids formation or an increase in viscosity, while assisting in rapid thorough emulsification of the reactants.

In addition to the foregoing it has also been discovered that the most preferred materials to select as surfactants according to the present invention are those having molecular weights in excess of 1000. Since an almost infinite variety of ethoxylated (propoxylated propylene glycol) compounds can be prepared it is desirable to select those for use that have molecular weights in excess of about 1000, exhibit an HLB of less than 4 and preferably less than 2 and which in addition do not react to form solids or to increase the viscosity when placed in prolonged contact with the isocyanate selected.

From the foregoing it can be seen that the surfactant of choice can be mixed with the polyol or the isocyanate prior to use or added separately to achieve the same results. Preferably, the polyol and the surfactant are mixed together before incorporation of the polyol into the isocyanate in the conventional manner of producing rigid polyurethane foams.

The following Table summarizes the kinds of results obtained utilizing various surfactants. The HLB values reported were obtained as described in the previously identified Schonfeldt and Griffin articles, where the emulsifying ability of water-in-oil and oil-in-water emulsifiers can be calculated or related to known emulsifiers empirically.

TABLE I

| PRODUCT TRADE NAME | CHEMICAL DESCRIPTION | HLB NUMBER | CONCENTRATION IN PARTS BY WEIGHT PER HUNDRED PARTS OF POLYOL | PRESENCE OF EARLY BUBBLES | % CLOSED CELLS |
| --- | --- | --- | --- | --- | --- |
| Witco Witcomul 78 | Sorbitan Monotallate | 4.6 | 1.0 | Few | Coarse Cells |
| Witco Witcomul 78 | Sorbitan Monotallate | 4.6 | 2.0 | Few | 79.8 |
| Witco Witcomul 78 | Sorbitan Monotallate | 4.6 | 3.0 | Very Few | 83.4 |
| Emery Emsorb 2503 | Sorbitan Trioleate | 2.7 | 2.0 | — | 84.3 |
| Emery Emsorb 2503 | Sorbitan Trioleate | 2.7 | 1.0 | Few | 83.1 |
| Emery Emsorb 2500 | Sorbitan Monooleate | 4.6 | 1.0 | Some | 69.2 |
| Emery Emsorb 2503 | Sorbitan Trioleate | 2.7 | 0.5 | Yes | 82.1 |
| Emery Emsorb 2503 | Sorbitan Trioleate | 2.7 | 1.0 | Few | 84.0 |
| Emery Emerest 2423 | Glycerol Trioleate | 3.0 | 1.0 | Yes | 82.4 |
| Emery Emsorb 2423 | Glycerol Trioleate | 3.0 | 2.0 | Yes | 82.9 |
| Emery Emsorb 2503 | Sorbitan Trioleate | 2.7 | 2.0 | Some | 82.9 |
| Emery Emsorb 2503 | Sorbitan Trioleate | 2.7 | 3.0 | Few | 83.6 |
| BASF Pluronic L101 | Ethoxylated Hydrophobic Base | 1.0 | 0.5 | None | 84.0 |
| BASF Tetronic 1301 | Ethoxylated Hydrophobic Base | 1.5 | 0.5 | None | 83.2 |
| BASF Tetronic | Ethoxylated Hydrophobic | | | | |

TABLE I-continued

| PRODUCT TRADE NAME | CHEMICAL DESCRIPTION | HLB NUMBER | CONCENTRATION IN PARTS BY WEIGHT PER HUNDRED PARTS OF POLYOL | PRESENCE OF EARLY BUBBLES | % CLOSED CELLS |
|---|---|---|---|---|---|
| L101 | Base | 1.0 | 1.0 | None | 84.9 |
| BASF Tetronic 1501 | Ethoxylated Hydrophobic Base | 1.0 | 0.5 | None | 84.3 |
| BASF Tetronic 1501 | Ethoxylated Hydrophobic Base | 1.0 | 0.1 | Many | 82.62 |
| BASF Tetronic 1501 | Ethoxylated Hydrophobic Base | 1.0 | 0.062 | Some | 49.68 |
| BASF Pluronic L101 | Ethoxylated Hydrophobic Base | 1.0 | 2.0 | None | 84.9 |
| BASF Pluronic L101 | Ethoxylated Hydrophobic Base | 1.0 | 0.2 | None | 85.0 |
| BASF Pluronic L101 | Ethoxylated Hydrophobic Base | 1.0 | 0.1 | Many | 83.87 |
| BASF Pluronic L101 | Ethoxylated Hydrophobic Base | 1.0 | 0.062 | Some | 25.46 |
| BASF Tetronic 1301 | Ethoxylated Hydrophobic Base | 1.5 | 0.2 | None | 84.5 |
| BASF Tetronic 1501 | Ethoxylated Hydrophobic Base | 1.0 | 0.2 | None | 84.1 |
| BASF Pluronic L121 | Ethoxylated Hydrophobic Base | 0.5 | 0.062 | Some | 35.22 |
| BASF Pluronic L121 | Ethoxylated Hydrophobic Base | 0.5 | 0.1 | Many | 84.08 |

In analyzing the foregoing Table it has been determined that it is desirable that the reaction mixture not exhibit significant early bubbling. This observable test for the efficacy of the surfactant is in addition to the criteria described hereinbefore for the most preferred results.

Typically a satisfactory rigid foam product with any surfactant should contain more than 80% closed cell formation when analyzing the test bun. A section through a test bun of a typical satisfactory product is shown in FIG. 2. Further as a matter of choice a creamy tan appearance is also preferred over darker brown colors. All of these criteria are met by the use of an ethoxylated (propoxylated propylene glycol) surfactant having a molecular weight above 1000 and which exhibits no visually observable reaction with the isocyanate of choice and has a HLB number less than 4 and preferably less than 2.

In the practice of the present invention the selection of reactants is conventional and all the well known techniques for polymerization of polyols and isocyanates can be employed if the criteria for selection of the surfactant described herein are utilized.

Typical isocyanate compositions useful in the preparation of rigid polyurethane foams would include suitable isocyanates or reactive NCO containing compounds which may be employed in practicing this invention including polymethylene polyphenylisocyanates with average functionality ranging from 2.1 to 5.0.

Typical polyol resin reactants suitable for use with the present invention would include by way of example: polyalkylene ether glycols, triols, etc. having up to 8 hydroxyl groups, and the polyhydric polyesters obtained by the reaction of a dicarboxylic acid with one or more polyhydric alcohols such as diol, triol, tetrol to produce a hydroxy terminated aliphatic polyester or aromatic type polyester polyol derived from polycarbomethoxy-substituted diphenyls, polyphenyl and benzylethers of the toluate family. Examples of polyhydric compounds include branch chain polyols of hydroxyl terminated condensation products of propylene oxide or of mixed ethylene and propylene oxides or other alkylene oxides with polyhydric alcohols of 2 to 8 hydroxyl groups such as with ethylene glycol, glycerol, 1, 3, 6-hexanetriol, pentaerythritol, sorbitol, sucrose and methyl glucoside, or with diamines and triamines linear polyols such as dipropylene glycol, tripropylene glycol, polypropylene ether glycol, polyisopropylene ether glycol, polyethylene propylene ether glycol, polyethylene ether glycol, polyhexamethylene ether glycol, polytetra methylene ether glycol and liquid hydroxy terminated polyesters formed by reaction of a dicarboxylic acid such as adipic or sebacic acid or their anhydrides with one or more or the above glycols or with a small amount of a higher polyol such as hexanetriol or pentaerythritol to give some branching.

The preferred polyol or polyol combination would be those exhibiting a hydroxyl number between 300-600 with an average functionality between 2.0-8.0.

Typical surfactants suitable for use with the present invention include the emulsifying agents useful as cell modifying agents in the manufacture of polyurethane foams according to this invention were selected from materials where the organic compounds contain in their molecules ester, ether, or hydroxyl groups. These organic compounds preferably should have an average molecular weight within the range of from 350 to 15,000, a hydroxyl number within the range of from 0 to 200 and an acid number within the range of from 0 to 50.

The aforesaid organic compounds may be obtained by polycondensation, polymerization, or polyaddition reactions. On example of these organic compounds includes a partial or complete ester of a higher fatty acid and a polyhydric alcohol such as e.g. mono, di-, and triglycerides or mixtures thereof, partial or complete esters of a high fatty acid and ethoxylated polyhydric alcohols, condensates of ethylene oxide with propoxylated adducts such as e.g. ethylene glycol, glycerin, propylene glycol, and ethylene diamine.

The selection of components then is simply a matter of choice as long as the criteria described herein for the selection of the surfactant are observed. A wide range of materials can be employed without undue experimentation or the exercise of invention. The use of the preferred surfactants of choice are therefore not limited to a specific reactant mixture and the scope of the invention is only limited by the appended claims.

I claim:

1. A process for producing rigid foam from the reaction of a polyol and an organic polyisocyanate including the step of incorporating into at least one of said polyol and said polyisocyanate an effective amount of an ethoxylated (propoxylated propylene glycol) to sufficiently emulsify the reactants during mixing to produce small, uniform cell sizes in said rigid foam produced thereby, said ethoxylated (propoxylated propylene glycol) having an HLB value of less than about 4 and incapable of producing, on standing, a visible reaction product such as a skin or other indications of solids formation, gas evolution or an increase in the viscosity of said isocyanate when mixed with said polyisocyanate independently of said polyol.

2. A process as set forth in claim 1 wherein said effective amount of said ethoxylated (propoxylated propylene glycol) is from 0.1 parts to 3.0 parts per 100 parts by weight of said polyol.

3. A process as set forth in claim 1 wherein said ethoxylated (propoxylated propylene glycol) has a molecular weight greater than 350.

4. A process as set forth in claim 1 wherein said ethoxylated (propoxylated propylene glycol) has an HLB value less than 2.

UNITED STATES PATENT AND TRADEMARK OFFICE
CERTIFICATE OF CORRECTION

PATENT NO. : 4,362,823

DATED : December 7, 1982

INVENTOR(S) : David G. Wernsing

It is certified that error appears in the above—identified patent and that said Letters Patent is hereby corrected as shown below:

Column 8, line 3 should read...

"polyisocyanate when mixed with said polyisocyanate..."

Signed and Sealed this

First Day of March 1983

[SEAL]

Attest:

Attesting Officer

GERALD J. MOSSINGHOFF

Commissioner of Patents and Trademarks